United States Patent [19]
Inkster

[11] Patent Number: 6,112,405
[45] Date of Patent: *Sep. 5, 2000

[54] ASSEMBLY OF COMPONENTS

[75] Inventor: John C Inkster, Hertfordshire, United Kingdom

[73] Assignee: Unilever Patent Holdings BV, Vlaardingen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/778,220

[22] Filed: Jan. 8, 1997

[30] Foreign Application Priority Data

Sep. 27, 1996 [EP] European Pat. Off. ............. 96307104

[51] Int. Cl.⁷ ..................................... B23P 21/00
[52] U.S. Cl. ................... 29/785; 29/413; 269/56; 428/571; 428/572
[58] Field of Search ............ 269/55, 56, 289 R; 29/785, 413; 221/76, 121; 428/571, 572

[56] References Cited

U.S. PATENT DOCUMENTS

| | | | |
|---|---|---|---|
| 2,733,479 | 2/1956 | English | 18/42 |
| 2,944,329 | 4/1960 | Mac Kay | 428/572 |
| 2,996,794 | 8/1961 | Burdick | 428/572 |
| 3,151,359 | 10/1964 | Campbell et al. | 29/785 |
| 4,639,135 | 1/1987 | Borer et al. | 356/246 |
| 5,354,177 | 10/1994 | Chang | 416/219 A |

FOREIGN PATENT DOCUMENTS

| | | | |
|---|---|---|---|
| 0 292 758 | 11/1988 | European Pat. Off. | B25B 23/06 |
| 0 537 926 A1 | 4/1993 | European Pat. Off. | B25B 23/04 |
| 34 20 186 | 12/1985 | Germany | B65D 85/58 |
| 62-068714 | 3/1987 | Japan | B29C 45/26 |
| WO 96/01167 | 1/1996 | WIPO | B23P 19/04 |

*Primary Examiner*—David P. Bryant
*Assistant Examiner*—Jermie E. Cozart
*Attorney, Agent, or Firm*—Pillsbury Madison & Sutro LLP

[57] ABSTRACT

A component assembly, or fan, comprises a hub having secured thereto a plurality of radially extending components. The hub, which is generally of semi-circular configuration, includes planar raised portions constructed and arranged to be vacuum gripped by a rotary indexing support, or turret, and holes which accommodate guide rods of a hopper for storing a supply of the fans. The components are connected to the hub at angularly spaced intervals by severable linkage portions.

3 Claims, 7 Drawing Sheets

ASSEMBLY OF COMPONENTS

FIELD OF THE INVENTION

This invention relates to assembly of components into multi-component items and concerns the supply of components for automated assembly into multi-component items.

BACKGROUND OF THE INVENTION

A number of different approaches are known for supplying components for automated assembly into multi-component items by automated assembly machinery. Typically, this involves sequential supply of a plurality of identical components each in a predetermined orientation to assembly machinery in a rapid and reliable manner.

One approach is to use a vibratory bowl feeder. Such a feeder includes a series of guides designed having regard to the components to be supplied thereby, which act to guide and constrain the components into the desired orientation while rejecting components not in the correct orientation, to produce an output consisting of a stream of properly oriented components. Such feeders when properly adjusted can work well, depending on the complexity of the components, but have the drawbacks of being noisy in operation, having a restricted maximum output, and also of the possibility of occasionally supplying a uncorrectly oriented component.

Centrifugal bowl feeders can supply components more quickly than vibratory bowl feeders but are only capable of handling relatively simple components, usually those with a high degree of symmetry that require orienting in one sense only (eg up/down but not also front/back). Centrifugal bowl feeders are also noisy.

A stack of correctly oriented components may be supplied from a hopper. This approach requires the preliminary step of producing the stack of components in the correct orientation.

The present invention concerns a novel approach to the supply of components for automated assembly.

SUMMARY OF THE INVENTION

In one aspect the present invention provides a component assembly comprising a hub having secured thereto a plurality of radially extending components.

The component assembly resembles a fan, and for this reason is often referred to herein as a fan.

The fan of the invention is used to supply components sequentially to automated assembly machinery, with each component in turn being removed from the supporting hub for processing by the assembly machinery. After all components have been removed the spent hub is discarded.

The hub and components are preferably of unitary construction, being formed of a single piece of material, eg as a one piece moulding of suitable material, typically suitable rigid plastics material such as polystyrene. However, other arrangements by which the components may be removably secured to the hub can be envisaged, for instance using intermediate carrier or supporting elements or portions, possibly of different material, for securing the components to the hub.

Each component is preferably secured to the hub by means of a respective associated linkage portion of the hub that is adapted to be readily ruptured for removal of the component from the hub, eg by the linkage portion being of material of reduced width and/or thickness. The linkage portions are preferably substantially rigid in the plane of the fan to prevent undesired movement of the components relative to the hub, but may permit a degree of flexing in a direction transverse to the plane of the fan to assist placing of components in assembly machinery and removal of components from the hub.

The hub is preferably substantially rigid, with the components having properties appropriate to the components in question. Typically the components will also be substantially rigid.

The fan is typically of generally circular or part-circular configuration, and conveniently is in the form of a sector of a circle subtending on angle of about 180°, preferably a few degrees less than 180° to facilitate handling.

The number of components on a fan can be varied to suit requirements having regard to the angle of the fan and the nature and size of the components. 20 to 30 components per semi-circular fan are convenient numbers.

Typically each fan will comprise a plurality of identical components, but situations can be envisaged where it might be desired for the fan to carry, say, alternating components of somewhat differing construction.

The components may be of any desired configuration. However, for reasons of space efficiency the invention is best suited for use with components of generally elongate, relatively narrow and generally planar centrifugation.

The invention finds particular application to the supply of plastics casing halves of analytical test devices, eg for pregnancy testing, of the general construction as described in, for instance, EP 0291194 and WO95/13542. Such casing halves are of the preferred generally elongate, relatively narrow and generally planar configuration. For assembly into a complete test device, the casing halves need to be presented correctly oriented in two senses, both up/down and front/back. While such casing halves can be supplied by vibratory bowl feeders, difficulties do arise and it has been found that the maximum supply rate achievable using this technique is about 60 per minute. Supply is also not totally reliable, with the possibility of incorrectly oriented casing halves occasionally being supplied. In contrast, by using a fan of the invention to supply such casing halves, supply rates of 100 per minute can easily be achieved with ensured correct orientation and precise positioning, and also considerably quieter operation.

In a preferred aspect, therefore, the invention provides a component assembly comprising a hub having removably secured thereto a plurality of casing halves for analytical test devices. This assembly is preferably in the form of a one piece plastics moulding of generally semi-circular configuration.

The hub may be shaped to assist automated handling. For example, the hub may include raised portions for vacuum gripping to permit carrying and placing of the fan, eg by a robot arm. The hub may also include registration holes to receive rods extending from a support, for initial positioning of the fans.

The fans are conveniently supplied in the form of a stack. Where the fans are of semi-circular configuration, two stacks of fans, together forming a circular cylindrical arrangement, are conveniently supplied on a storage base, possibly wrapped in plastics material, for transport. The stacks or arrangements of stacks can then be loaded into automated assembly machinery, eg onto a support including upwardly extending pins to pass through registration holes in the hubs as mentioned above.

As noted above, the fans are used to supply components to automated assembly machinery.

In one convenient arrangement the fans are moved in turn from a supply stack on a support (which conveniently has upwardly extending rods passing through holes in the hub as noted above) to a loading station for supply to the main assembly machine. At the loading station, the fan is placed on a circular rotary indexing support that supports the hub, with the components protruding radially beyond the support. The support indexes to bring the leading component of the fan into position over a receiving slot in the main assembly machine. A cutter element is activated and acts to remove the component from the hub and locate the component in the receiving slot. For accurate location, this removal/location step desirably involves the component, while still attached to the hub, being initially downwardly deformed to locate the free end of the component in the receiving slot, followed by cutting to remove the component from the hub. The support then indexes on to bring the next component into position over the next receiving slot of the main machine that has synchronously been moved into position.

A second fan is placed on the rotary indexing support while components are being removed from the first fan: this is one of the reasons why it is preferred to use semi-circular fans. When all components have been removed from the first fan, the spent hub is removed, making space for the next, third, fan. In this way a continuous supply of components to the main assembly machine can be maintained.

The fans are conveniently moved from the supply stack on the support to the loading station by a computer controlled robot arm with vacuum heads for gripping the hub, preferably raised portions of the hub as mentioned above. Spent hubs may be removed by the same robot arm of by a similar separate dedicated robot arm.

Stacks of fans on the support can be replenished at intervals as required, eg manually.

Operation may be monitored by suitable sensors in known manner.

Once supplied to the main assembly machine, the components will typically be assembled with further components. This may be carried out in known manner using known equipment, for example based on a Polyfactor (Polyfactor is a Trade Mark) automatic assembly machine from Mikron SA Boudry, Switzerland, with the receiving slots mentioned above being in fixtures in the rotary indexing table of the Polyfactor machine.

The invention is well suited to use in the assembly of analytical test devices as mentioned above, with fans being used to supply lower casing halves and upper casing halves. A typical assembly operation involves assembling in order a lower casing half (from a fan as described above), a strip of nitrocellulose "backed" or laminated onto a supporting plastics strip, a wick strip, a plastics cover sheet, a piece of dessicant, an upper casing half (also from a fan as described above) and finally a cap. Using a Mikron Polyfactor rotary indexing machine as the main assembly machine, and feeding the fans as described above, with all operations being computer controlled using known technology, an assembly rate of 100 devices per minute can be readily and reliably achieved.

In another aspect, the invention provides automated assembly apparatus, including means for supplying components for assembly from a component assembly in accordance with the invention.

The supplying means conveniently comprises a loading station comprising a rotary indexing support for receiving the hub of a component assembly, and cutting means for removing a component from an assembly on the support and locating the removed component in an assembly line.

The apparatus desirably also includes means for moving component assemblies from a supply to the loading station, and means for removing spent hubs from the loading station. These means are conveniently constituted by one or more robot arms.

The invention also includes within tis scope a method of automated assembly, comprising supplying components for assembly from a component assembly in accordance with the invention.

The invention also covers the resulting assembled object, such as an analytical test device.

BRIEF DESCRIPTION OF THE DRAWINGS

The invention will now be described, by way of illustration, with reference to the accompanying drawings, in which.

DETAILED DESCRIPTIONS OF THE DRAWINGS

Figure 1:
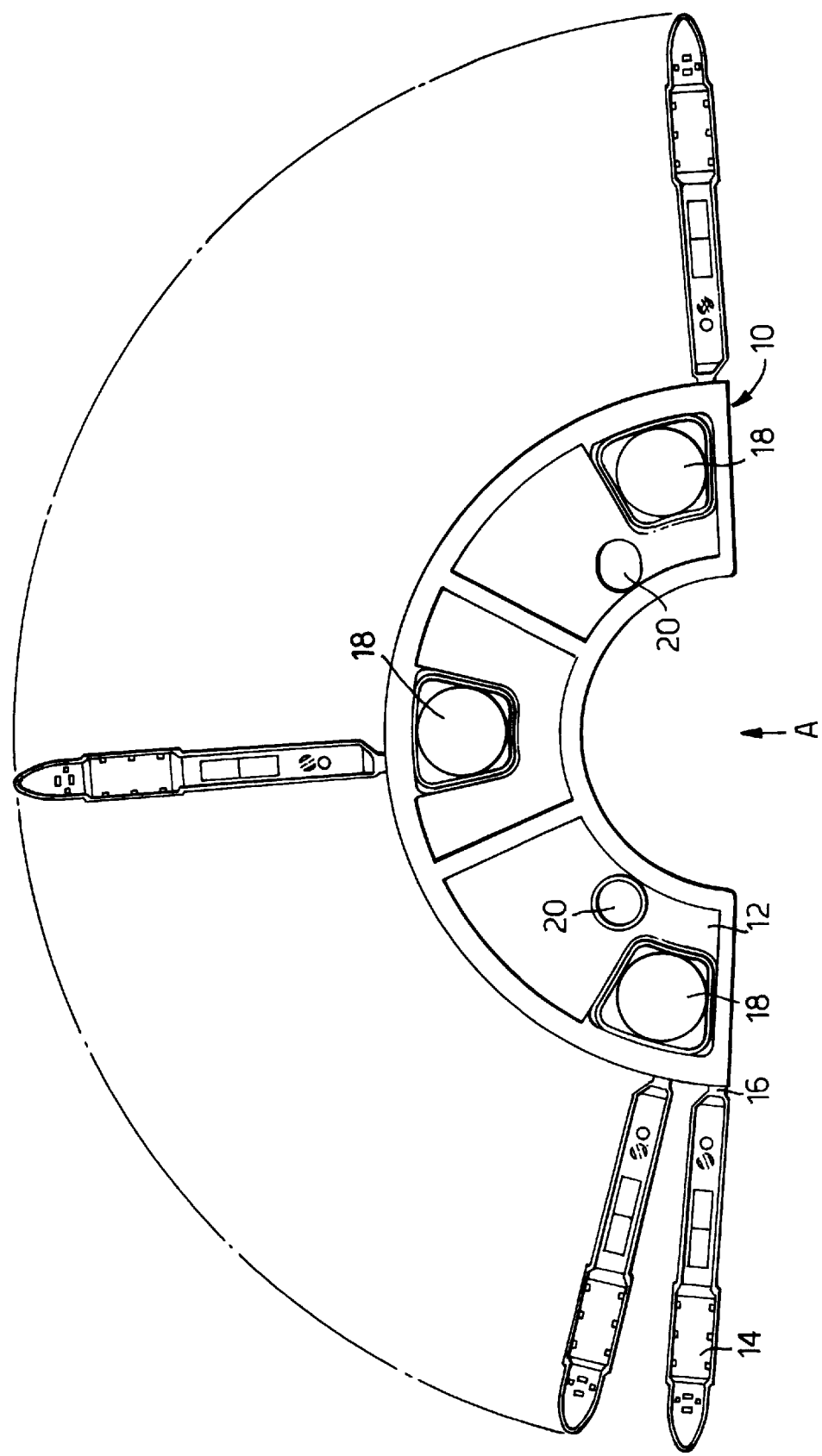
FIG. 1 is plan view of one embodiment of a component assembly (or fan) in accordance with the invention comprising a plurality of lower casing halves intended to form part of analytical test devices generally as disclosed in EP 0291194 and WO95/13542, viewed from above, ie the side of the casings that will be internal on assembly.
Figure 2:
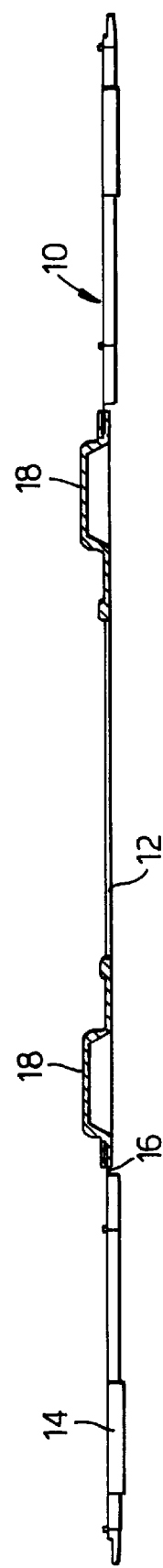
FIG. 2 is a side view of the fan of FIG. 1 in the direction of arrow A, shown partly in section.

Referring to the drawings, FIGS. 1 and 2 show a component assembly or fan 10 comprising a hub 12 from which extend radially outwardly at equal spacings twenty comprising a hub 12 from which extend radially outwardly at equal spacings twenty identical components 14 secured to the hub via respective linkage portions 16 of reduced width and thickness. For clarity, only four of the components 14 are shown in FIG. 1.

Fan 10 is in the form of a one piece medium impact polystyrene (BASF 432D) injection moulding, of generally semi-circular configuration, subtending an angle of about 175° with a radius of 160 mm. Each component 14 is 80 mm in length. Each component is separated by an angle of 9°, so that two side-by-side fans together form a circular array of forth equally angularly spaced components.

The hub 12 includes three planar raised portions 18 for vacuum gripping, and two holes 20 for guide rods.

Each component 14 comprises a lower casing half intended to form part of an analytical test device generally as disclosed in EP 0291194 and WO95/13542, and includes internal formations to assist in assembly operations in known manner.

Figure 4:
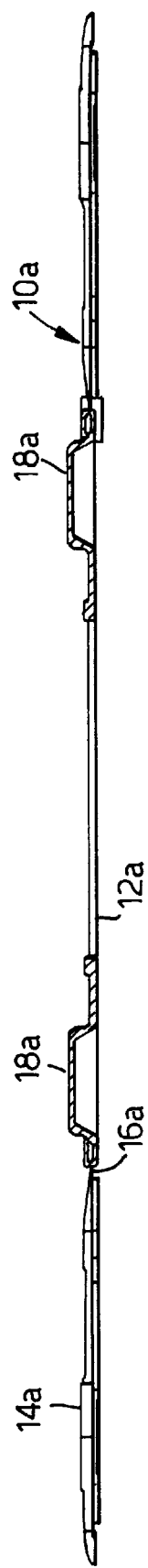
FIGS. 3 and 4 corresponds to FIGS. 1 and 2, respectively, and show another embodiment of fan comprising a plurality of upper casing halves for assembly with the lower casing halves of the fan of FIGS. 1 and 2.
Figure 3:
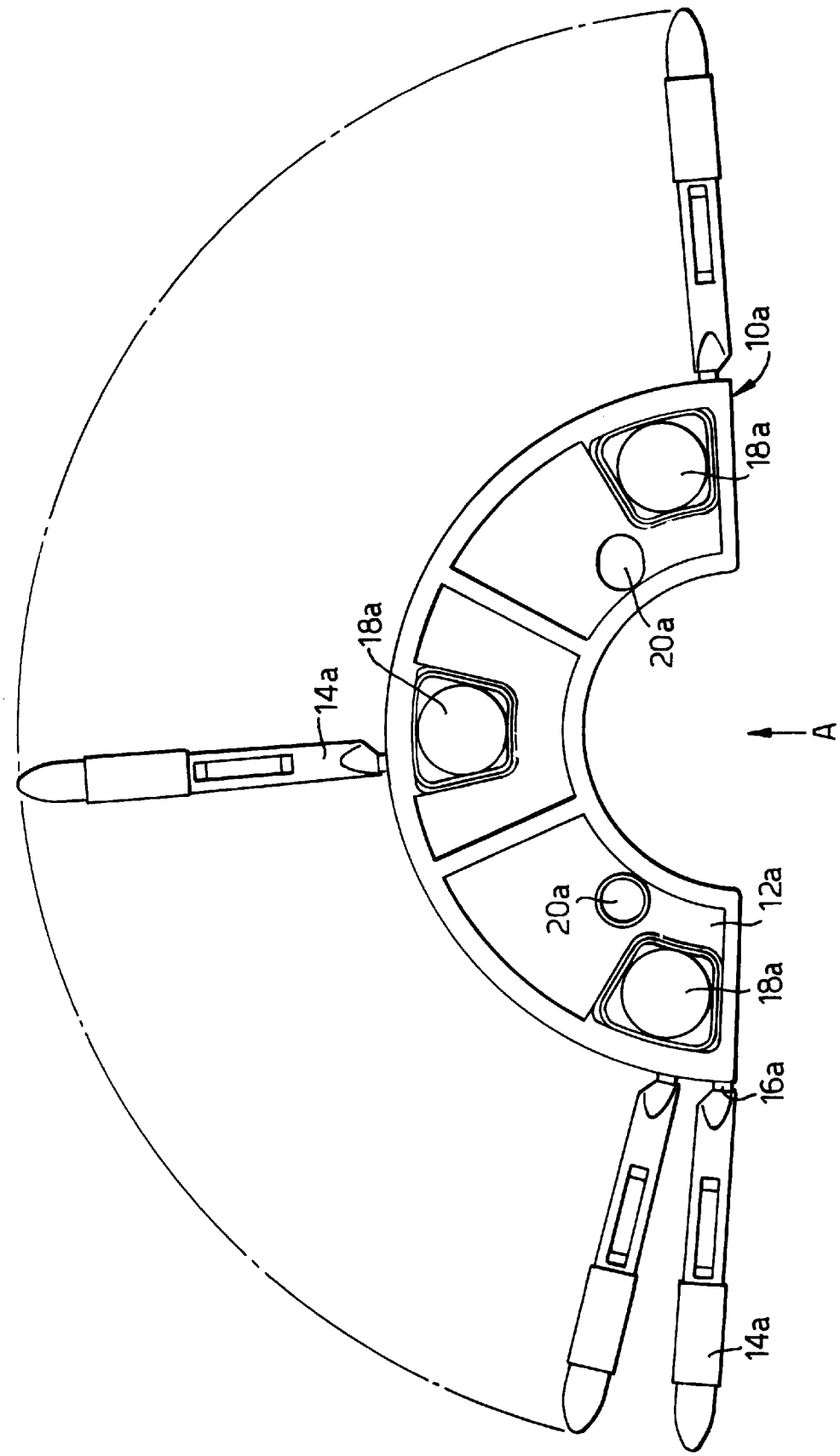

FIGS. 3 and 4 show a similar fan 10*a* in which components 14*a* are upper casing halves for assembly with the lower casing halves 14 in production of a complete test device. In FIGS. 3 and 4, corresponding elements are numbered as in FIGS. 1 and 2, but with the suffix a. In FIG. 3, the outer faces of the upper casing halves are visible, so internal detail is not apparent.

Figure 5:
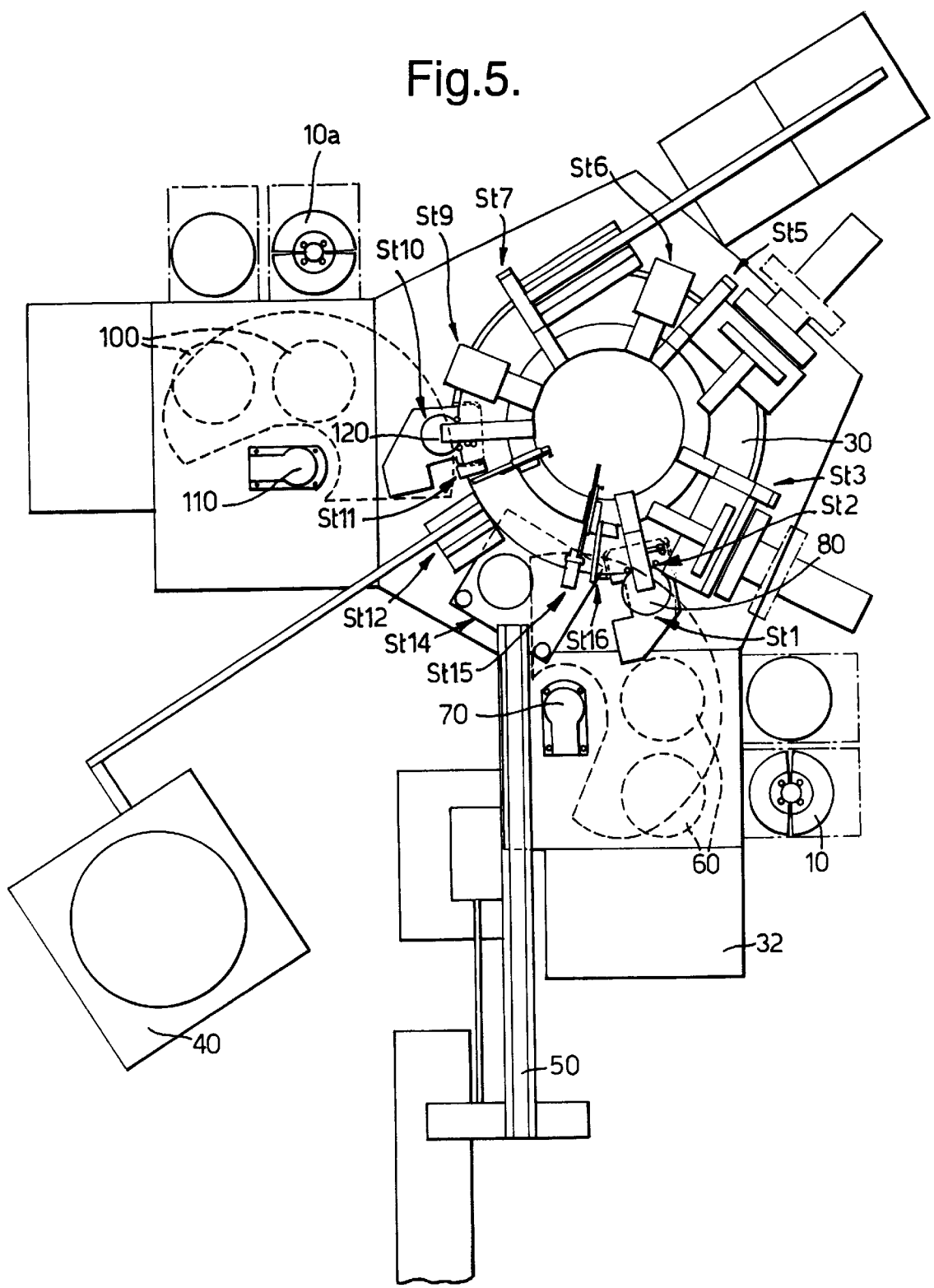
FIG. 5 illustrates schematically in plan view an automated assembly apparatus for assembling a test device using casing halves supplied from fans as shown in FIGS. 1 to 4.

FIG. 5 is a schematic plan view of automated assembly apparatus for assembling test devices from a number of different components including lower and upper casing halves supplied from the fans of FIGS. 1 to 4.

The heart of the assembly apparatus is a Polyfactor 92 (Polyfactor ie a Trade Mark) automatic assembly machine from Mikron SA Boudry, Switzerland. The Polyfactor machine is based on a circular rotary indexing table 30 having a series of assembly and control stations with associated assembly and control equipment.

The Polyfactor machine comprises a circular, cast iron base which carries a rigid machine frame that supports the rotary table and other components including a central drive system with main motor, speed variatior and indexing device, a cam shaft and overload protection for the rotary table. The rotary table 30 is of aluminum and is 1180 mm in diameter. The table includes 72 fixtures each comprising a radially extending slot treaded in black for improved camera image separation.

An electrical cabinet 32 contains all electrical equipment, together with a Siemens programmable control for the control and monitoring of the machine, as well as an electronic memory system. In use, the memory system receives information from the control units and orders either continuation of the assembly process or immediate cancellation of subsequent assembly operations.

The assembly apparatus is designed to assemble analytical test devices such as pregnancy testing devices, generally as disclosed in EP 0291194 and WO95/13542 from the following components:
1 lower casing half
1 nitrocellulose strip
1 wick strip
1 cover sheet
1 dessicant tablet (optional)
1 upper casing half
1 cap.

To this end, the apparatus includes a number of stations, identified in FIG. 5, where the following operations occur:

Station 1
This is a loading station for sequentially supplying lower casing halves 14 from fans 10 to fixtures in table 30, one casing half per fixture.

Station 2
This is a checking station for checking the presence and position of a lower casing half in a fixture by means of a checking unit (not shown).

Station 3
This is a station for supplying nitrocellulose strip (comprising nitrocellulose/polyester film laminate) which is fed in the form of a band of sheet from which an appropriately sized piece is cut and loaded into a lower casing half in a fixture.

Station 4
This is a spare station not i use and not shown in the illustrated embodiment. This may be used as a checking station, by being fitted with a checking unit with vision system.

Station 5
This is a station for supplying wick strip (comprising non woven polyester) which is fed in the form of a band or sheet from which an appropriately sized piece is cut and loaded into a lower casing half in a fixture.

Station 6
This is a checking station for checking the presence and position of the nitrocellulose strip and wick strip using a vision inspection system.

Station 7
This is a station for supplying cover strip (comprising 175 micron thick polyester film) which is fed in the form of a band or sheet from which an appropriately sized piece is cut and loaded into a lower casing half in a fixture.

Station 8
This is an optional station, not in use and not shown in the illustrated arrangement, for feeding an optional dessicant tablet (comprising a molecular sieve material) from a bowl feeder and loading it into a lower casing half in a fixture.

Station 9
This is a checking station for checking the presence and position of the nitrocellulose cover strip (and optional dessicant tablet if present) using a vision inspection system.

Station 10
This is a loading station similar to station 1 for supplying upper casing halves 14a from fans 10a and fitting them onto lower casing halves. The upper and lower casing halves fit together with a snap fit.

Station 11
This is a checking station for checking the presence and position of an upper casing half by means of a checking unit.

Station 12
This is a station for feeding an injection moulded polystyrene cap from a bowl feeder 40 and fitting a cap onto the assembled casing halves in a fixture.

Station 13
This is a checking station (not shown in FIG. 5) for checking the presence and position of the cap by means of a checking unit.

Station 14
This is an unloading station for unloading acceptable or good assemblies onto a take-off belt conveyor 50 to remove the acceptable assemblies for further handling.

Station 15
This is an unloading station for removing unacceptable or bad assemblies and passing them to waste.

Station 16
This is a checking station for checking a fixture is empty.

Station 17
This is a cleaning station (not shown in FIG. 5) for cleaning a fixture using a vacuum/brush system.

The construction and functioning of loading station 1 and associated equipment for storing and supplying fans 10 will now be described in greater detail with reference to FIGS. 5, 6, 7 and 8.

Fans 10 (shown somewhat schematically in FIGS. 6 and 8) are supplied for use with the assembly apparatus i the form of two side-by-side stacks forming a circular cylindrical arrangement, with 60 fans in each stack. The stacks are supported on a storage base and wrapped in plastics material for transport.

The assembly apparatus includes a fan storage and supply unit, comprising two side-by-side storage hoppers, shown schematically at 60 in FIG. 5, and a robot arm 70 for moving fans from the top of stacks in the hoppers 60 to the loading station 1 and for removing spent hubs from the loading station.

Figure 6:
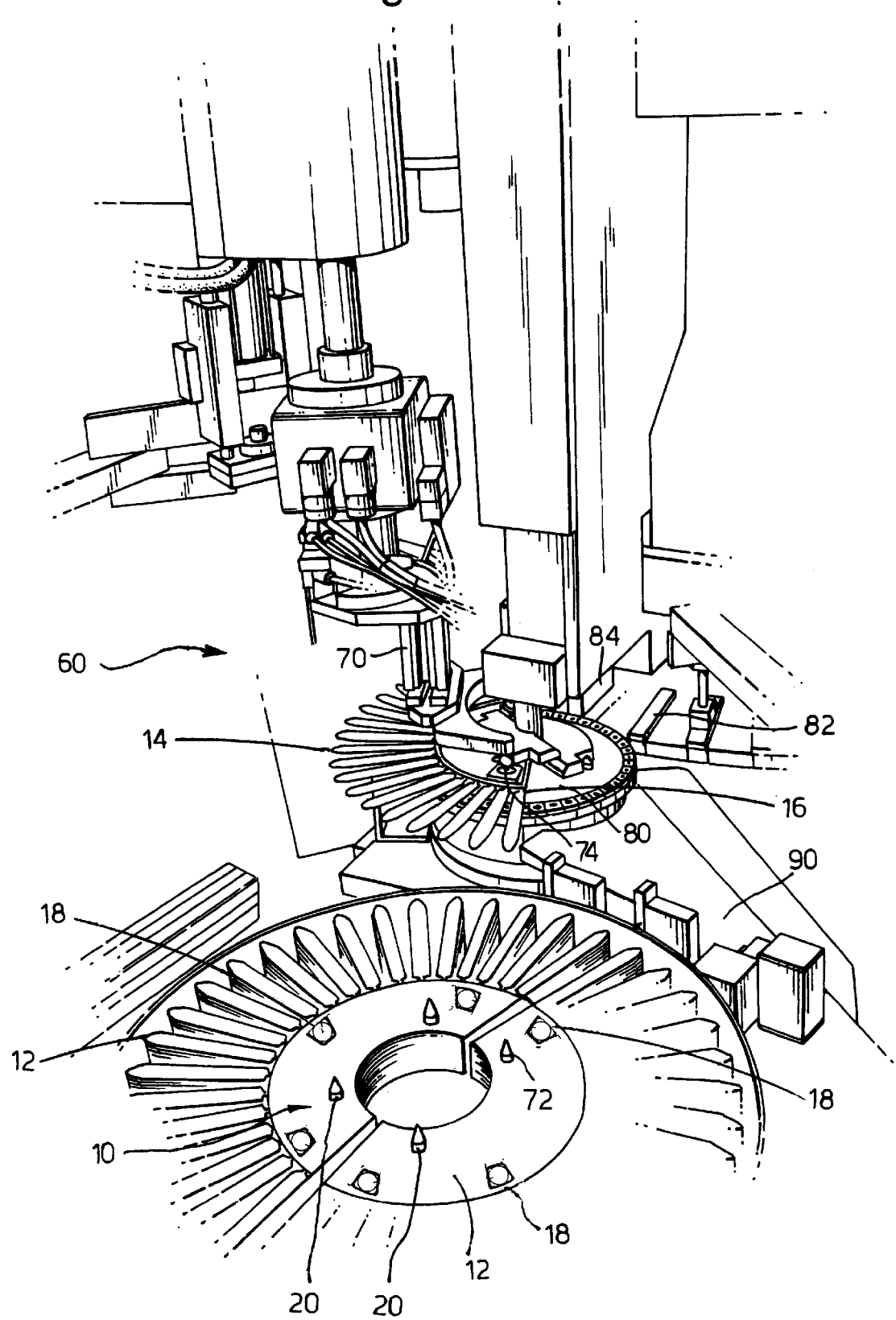
FIG. 6 is a perspective view showing a loading station of the apparatus of FIG. 5.
Figure 7:
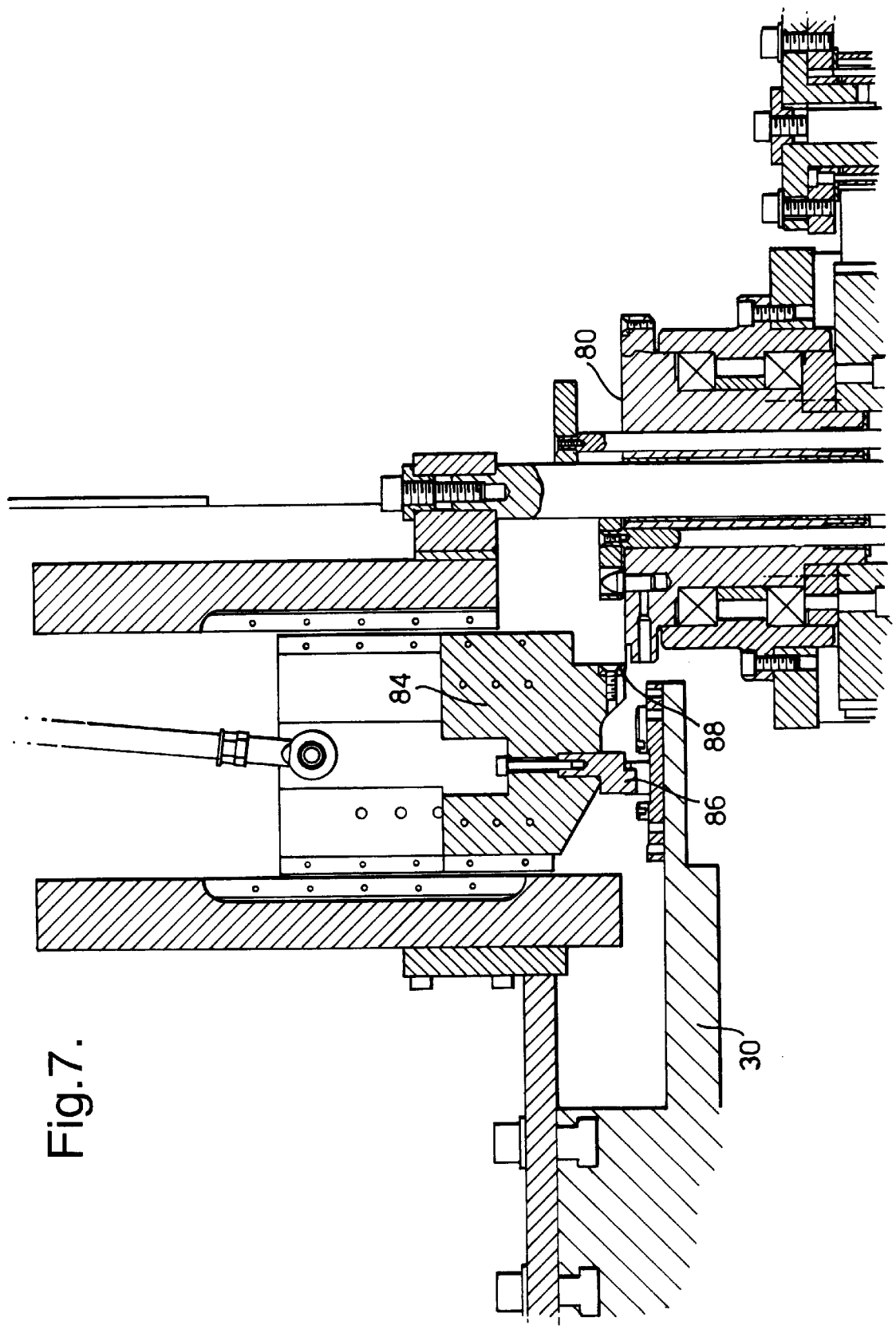
FIG. 7 is a sectional view illustrating part of the loading station of FIG. 6.
Figure 8:
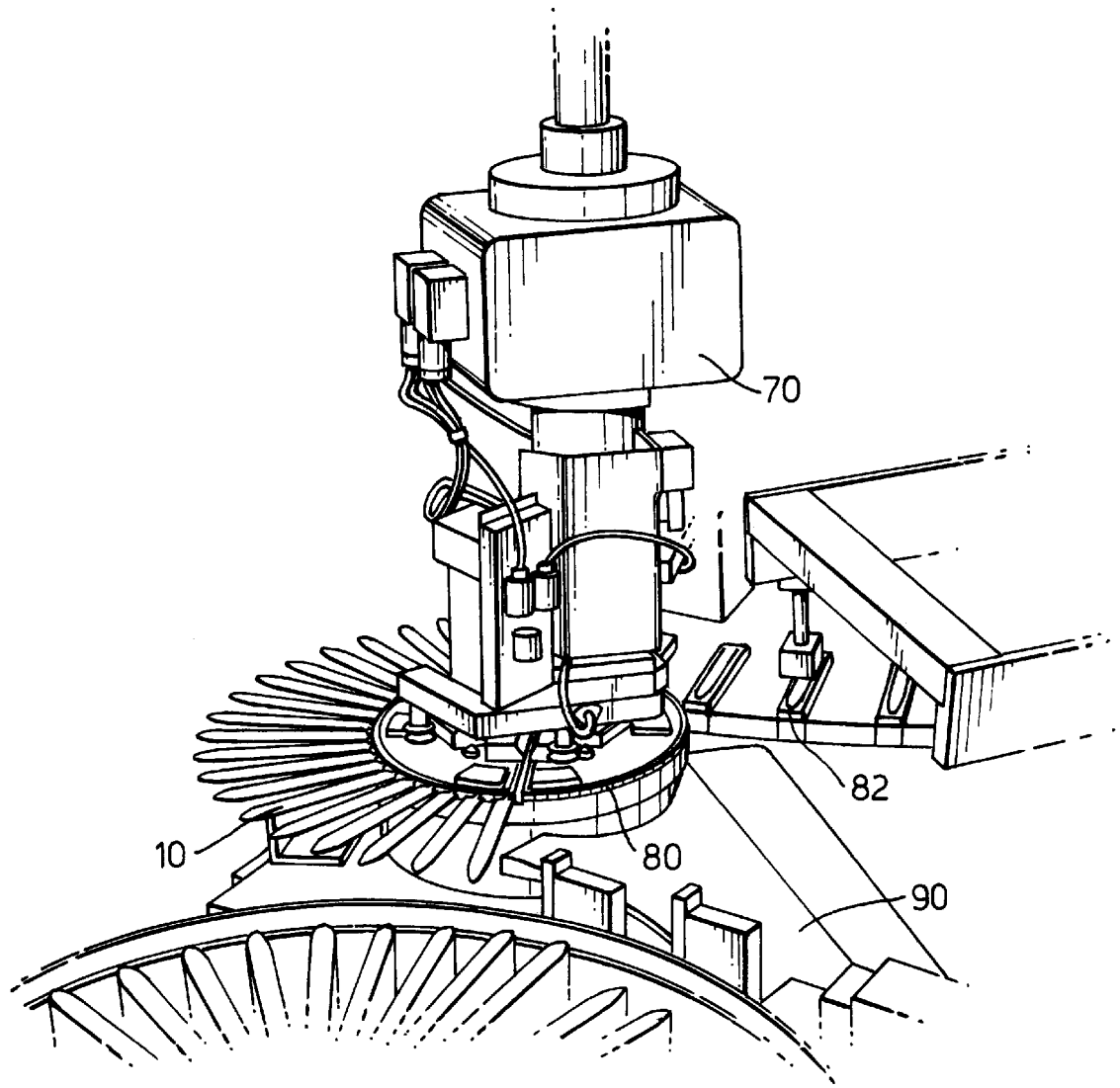
FIG. 8 is a further perspective view of the loading station as shown in FIG. 6.

The storage hoppers 60 each comprise a circular support, designed to receive a cylindrical arrangement of stacks of 120 fans as supplied. Four fixed upwardly extending guide rods 72 (FIG. 6) pass upwardly through holes in the support and through the holes 20 in the fans to align the fans and retain them in appropriate position. The robot arm 70 generally removes fans in turn from alternate semi-circular stacks in a hopper, with the support and fans carried thereby moving upwardly as fans are removed so that the uppermost fans are always at the top of the hopper, as shown in FIG. 6. Sensors (not shown) monitor the position of the uppermost fans in the stacks. When all the fans in one of the hoppers 60 have been used up, the robot arm 70 then removes fans from stacks in the adjacent hopper in exactly the same way. While this is occurring, a new supply of fans can be loaded into the first hopper, eg manually by an operator. In this way a continuous supply of fans can be maintained.

Robot arm 70 includes three vacuum heads 74, one of which is visible in FIG. 6, appropriately positioned for vacuum gripping of portions 18 of the fans 10. The robot arm 70 supplies fans from stacks in hoppers 60 to the loading station 1.

Loading station 1 comprises a circular rotary indexing turret or support 80 to which fans are supplied by robot arm 70. Support 80 supports the hub 12 of a fan 10, with the casing halves 14 protruding beyond the support. The support 80 indexes (by an angle of 9°) to bring the leading casing half 14 of the fan into stationary position over one of the fixtures 82 (FIGS. 6 and 8) in table 30, which is also now stationary. A cutter/placement head 84 (shown schematically in FIG. 6 and in more detail in FIG. 7) is activated and acts to remove the casing half from the hub, by rupturing the associated linkage portion 16, and also acts to locate the casing half in the appropriate fixture. During the removal/location step bead 84 moves downwardly so that its leading edge 86 (FIG. 7) engages a radially outer portion of the relevant casing half, while still attached to the hub, so that the casing half is initially downwardly deformed to locate the free end of the casing half in the fixture. On contrived downwards movement of head 84, a cutting blade 88 (FIG. 7) thereof shears the casing half from the hub. Downwards movement of the head 84 continues to ensure the casing half is fully located in the fixture.

After the casing half has been located, head 84 moves upwardly, support 80 indexes on in a clockwise direction to bring the next casing half into position over the next fixture in table 30 that has meanwhile indexed on in synchronism in an anti-clockwise direction to bring the next fixture into position. The removal/location step is repeated. The entire operation is repeated as many times as desired.

A second fan 10 is placed on the support 80 by the robot arm 70 while casing halves are being removed from the first fan. When all casing halves have been removed from the first fan, the spent hub is removed by robot arm 70, making space for the next fan. The spent hubs are dropped into chute 90 and collected for disposal as waste. In this way a continuous supply of casing halves to the rotary table 30 is maintained.

Loading station 10 is identical in construction and functioning to loading station 1, including two storage hoppers 100, robot arm 110 and circular indexing support 120, and acts to supply upper casing halves 14a from fans 10a.

The rotary indexing table 30 in use operates at a machine speed of 120 indexings per minute. Operation rate must reduced periodically to about 20 indexings per minute for strip change over at stations 3, 5 and 7. All of these stations supply strip from bands of 53 strips, and strip change over at the three stations is carried out at the same time. The nominal output of the apparatus is 110 pieces (ie assembled analytical test devices) per minute, and it if bound that an effective output of 100 pieces per minute can be sustained.

What is claimed is:

1. A unitary component assembly, comprising a one piece plastic molding of generally semi-circular shape, said molding comprising:

a planar hub; and a plurality of elongate casing halves for analytical test devices integrally formed with the hub for severing therefrom, and linkage portions interconnecting said hub and said casing halves, said linkage portions being severable to permit said casing halves to be separated individually and successively from said hub, wherein said casing halves extend lengthwise radially from said hub in line with said severable linkage portions in order to permit a plurality of said casing halves to be carried by said hub, said casing halves being equally spaced about said hub so that said assembly is generally in the shape of a fan, said hub including raised portions for vacuum gripping of said assembly and said hub also including registration holes for registering said assembly on a support.

2. An assembly according to claim 1, wherein the assembly is of generally circular or part-circular configuration.

3. An assembly according to claim 1, wherein each casing halve is of relatively narrow and generally planar configuration.

* * * * *